United States Patent Office 3,594,280
Patented July 20, 1971

---

3,594,280
PROCESSES FOR CARRYING OUT POLYSACCHARIDE-PRODUCING FERMENTATIONS
Pierre Colin and Michel Fleury, Melle, France, assignors to Melle-Bezons, Melle, France
No Drawing. Continuation-in-part of application Ser. No. 717,017, Mar. 28, 1968. This application May 28, 1970, Ser. No. 41,600
Int. Cl. C12d 13/00
U.S. Cl. 195—31           7 Claims

ABSTRACT OF THE DISCLOSURE

A fermentation process for producing polysaccharides by fermentations with microorganisms of the class Xanthomonas in which the broth containing carbohydrate is seeded with a volume of inoculum which does not exceed 2 parts by volume per 1000 parts by volume of broth and preferably less than 0.5 to 1 part by volume per 1000 parts by volume of broth with the medium utilized in preparation of the inoculum preferably being formulated to correspond with the composition of the broth.

---

This application is a continuation-in-part of our copending application Ser. No. 717,017, filed Mar. 28, 1968, and entitled "Processes for Carrying Out Polysaccharide-Producing Fermentations."

This invention relates to fermentations with polysaccharide-producing microorganisms.

Glucide fermentation by polysaccharide-producing microorganisms, more particularly by bacteria of the class Xanthomonas, such as *Xanthomonas campestris,* has been described. Such fermentation is ordinarily carried out in fermentation vats, provided with devices for aeration and mixing, starting from an aqueous medium in which the sugar, the most generally employed carbohydrate aliment, is present in an amount within the range of 15 to 30 grams per liter. The nitrogen aliments are selected of compounds containing complexed nitrogen, such as "distiller's dried solubles" or soyabean oil cake, in an amount within the range of 3.5 to 5 grams per liter and dipotassium or disodium hydrogen phosphate in an amount of about 5 grams per liter, which serves both to furnish necessary nutrient elements and to give the effect of a pH buffer.

In conventional processes, the fermentation is ordinarily initiated with the aid of a leaven or inoculum, the volume of which is at least 2% and usually 5% by volume of the "mout" (hereinafter referred to as the broth or must) to be fermented. Such a large amount of leaven makes it necessary, in commercial plants, where the volume of broth to be fermented is very large, to make use of a series of vessels of increasing capacity beginning with the microorganism culture on gelose in a test tube to the industrial fermentation vat. Generally, to seed a vat having a capacity of 50,000 liters, it is necessary to make use of the following stages in sequence for preparation of the inoculum, namely: test tube culture on gelose; 300 cm.³ Erlenmeyer flask; 6-liter vessel; 125-liter vessel; and finally, a 2500-liter vessel from which the fermentation vat is seeded. All of this involves considerable equipment, the maintenance of aseptic conditions through each stage of inoculum preparation, and highly trained personnel.

It is an object of this invention to greatly simplify the seeding process whereby a considerably lesser than conventional amount of leaven is required for seeding the fermentation vat and it is an object to provide a method and means for achieveing same.

In accordance with the practice of this invention, a fermentation broth containing a carbohydrate, such as starch, or a glucide or sugar, such as saccharose, glucose and levulose, is seeded with a volume of leaven corresponding to not more than two volumes of leaven to 1000 volumes of broth to be fermented and preferably less than 0.5 to 1 volume of leaven per 1000 volumes of the broth. In a preferred practice, the nutrient medium utilized to prepare the leaven is substantially the same as the composition of the broth.

As will be seen from the following examples, considerable reduction in volume of the leaven does not interfere with the fermentation procedure but, in addition, considerable advantages are derived from the ability to make use of such lesser amounts. Thus the utility of the invention is clear. To seed an industrial fermentation vat having a capacity of 50,000 liters, in accordance withthe practice of this invention, besides the microorganism culture in the Erlenmeyer flask of 200 to 500 cm.³, there is only need for one intermediate stage corresponding to a leaven vat of 25 to 50 liters, at the utmost, which amounts to laboratory-scale equipment.

The following examples are given by way of illustration, but not by way of limitation, of the practice of this invention:

EXAMPLE 1

In a fermentation vat having a total capacity of 1200 liters, and provided with devices for aeration and stirring, there is introduced 800 liters of water, 18 kg. of saccharose, 3.6 kg. of soyabean oil cake, 4.5 kg. of dipotassium hydrogen phosphate and 0.18 kg. of magnesium phosphate. Steam is injected into the mixture to bring it to and to maintain it at boiling point temperature for one hour.

After cooling to 30° C., by passing cold water through a jacket surrounding the vat, the broth is aseptically seeded with 500 cm.³ of a culture of *Xanthomonas campestris.* To obtain this culture, a 1-liter flask containing 500 cm.³ of a nutrient medium analogous to the broth to be fermented was seeded by means of a small amount of Xanthomonas cultivated in gelose in a test tube. The flask was maintained for 48 hours at a temperature of 30° C. while being aerated by bubbling sterile air therethrough.

The fermentation in the 1200 liter vat is completed after 108 hours to yield a broth containing 14.7 grams of polysaccharides per liter and having a viscosity of 6200 centipoises, measured with a Brookfield viscosimeter LVT, speed 30 r.p.m., needle No. 4.

EXAMPLE 2

Comparative fermentation experiments were carried out utilizing various proportions of leaven seed. For this purpose, there was used fermentation vats having a capacity of 10 liters, containing 5 liters of broth formulated per liter of 20 grams saccharose, 4 grams of distiller's dried solubles, 5 grams of dipotassium hydrogen phosphate and 0.25 gram of magnesium sulfate. The temperature was maintained at 29° C. for the duration of each fermentation.

To prepare each leaven for seeding the vats, 160 cm.³ of medium identical with the medium to be fermented was inoculated in an Erlenmeyer flask with a small amount of a culture on gelose of *Xanthomonas campestris*. After incubation at 30° C. for 48 hours while shaking up and down, the whole or part of the contents of the flasks was used for seeding the vats.

The following table gives the polysaccharide yields calculated as grams of polysaccharide obtained from 100 grams of saccharose for various fermentation times and different volumes of seeding leaven. The yield of the fermentation is realized by the substantially complete consumption of the sugar, of which less than 1.5 grams per liter remains in the fermented broth.

| Volume of leaven (ml.) | Leaven as reckoned percent by volume of the broth | Fermentation time (hours) | Yield (percent by weight of the sugar) |
|---|---|---|---|
| 2.5 | 0.05 | 112 / 136 | 70 / 69 |
| 5 | 0.1 | 112 / 136 | 75 / 71 |
| 50 | 1 | 124 / 136 | 71 / 69 |
| 100 | 2 | 112 / 124 | 74 / 70 |
| 250 | 5 | 112 / 124 | 72 / 68 |
| 500 | 10 | 112 / 136 | 69 / 71 |

It will be seen from the tabulated results that there is no significant difference between the results, either in yield or in fermentation rate, caused by the decreased concentration of seed or leaven.

EXAMPLE 3

The carbohydrate source used is a starch hydrolysis product having the following composition:

Directly reducing sugars (mainly glucose) _____ percent by weight __ 70
Total reducing sugars _____ do _____ 88
Water (Fisher test) _____ do _____ 16
P (reckoned as $P_2O_5$) _____ p.p.m __ 450
Total N _____ p.p.m __ 400
$SO_2$ _____ p.p.m __ 100
Ashes _____ percent by weight __ 1.1

In a fermentation vat having a total capacity of 1200 liters, and provided with devices for aeration and stirring, there is introduced 1000 liters of water. 30 kg. of the above-defined starch hydrolysis product, 3.7 kg. of soyabean oil cake, 11.4 kg. of disodium hydrogen phosphate ($Na_2HPO_4 \cdot 12H_2O$), 0.25 kg. of magnesium sulfate ($MgSO_4 \cdot 7H_2O$) and 0.51 kg. of sulfuric acid at 65° Bé.

These components were sterilized separately, before introduction in the fermentation vat, in the following way:

(1) The disodium hydrogen phosphate, the magnesium sulfate, 0.26 kg. of sulfuric acid and 330 liters of water were maintained at 120° C. for one hour.

(2) The starch hydrolysis product, 0.05 kg. of sulfuric acid and 330 liters of water were maintained at 120° C. for one-half hour.

(3) The soyabean oil cake, 0.2 kg. of sulfuric acid and 330 liters of water were maintained at 125° C. for one hour and a half.

After cooling to 30° C., the broth is aseptically seeded with 1 liter of a culture of *Xanthomonas campestris*. This culture was obtained by seeding with a small amount of *Xanthomonas campestris* cultivated on gelose in a test tube a nutrient medium having the following composition:

| | G./liter |
|---|---|
| Saccharose | 20 |
| Soyabean oil cake | 3.5 |
| $Na_2HPO_4 \cdot 12H_2O$ | 8.1 |
| $NaH_2PO_4 \cdot 1H_2O$ | 1 |
| $MgSO_4 \cdot 7H_2O$ | 0.25 |

This leaven was maintained at 28° C. for 48 hours while being aerated by bubbling sterile air therethrough.

The final fermentation in the 1200-liter vat is completed after 86 hours to yield a broth having a viscosity of 4800 centipoises.

The yield, expressed as the weight ratio of dry polysaccharide to weight of reducing sugars present in the broth, is 67%.

EXAMPLE 4

The carbohydrate source used is mother liquor from production of levulose by inversion of saccharose, the mother liquor containing 80 g. per liter of reducing sugars, mainly glucose.

The mother liquor was sterilized by maintaining it at 120° C. for half an hour. The other components of the broth were sterilized by maintaining them at 125° C. for one hour and a half.

In a 1200-liter vat there is introduced 250 liters of the above-defined mother liquor, 750 liters of water, 4 kg. of soyabean oil cake, 11.4 kg. of disodium hydrogen phosphate ($Na_2HSO_4 \cdot 12H_2O$), 0.25 kg. of magnesium sulfate ($MgSO_4 \cdot 7H_2O$) and 0.5 kg. of sulfuric acid.

After cooling to 30° C., the broth is aseptically seeded with 1 liter of a leaven the same as that used in Example 3.

The final fermentation in the 1200 liter vat is completed after 86 hours to yield a broth having a viscosity of 3400 centipoises.

The yield expressed as the weight of dry polysaccharide to the weight of reducing sugars present in the broth is 53%.

EXAMPLE 5

In a 1200-liter vat there is introduced 1000 liters of water, 20 kg. of levulose, 4 kg. of soyabean oil cake, 11.1 kg. of disodium hydrogen phosphate ($Na_2HPO_4 \cdot 12H_2O$), 0.25 kg. of magnesium sulfate ($MgSO_4 \cdot 7H_2O$), and sulfuric acid to bring the pH value to 7.2–7.3.

This broth is inoculated with 1 liter of the same leaven as in Example 3. The fermentation is completed after 80 hours to yield a broth having a viscosity of 5400 centipoises and containing 14.3 g. per liter of dry polysaccharide.

The yield is 71.5%.

EXAMPLE 6

In a 1200-liter vat there is introduced 1000 liters of water, 15 kg. of starch, 4 kg. of soyabean oil cake, 11.1 kg. of disodium hydrogen phosphate ($Na_2HPO_4 \cdot 12H_2O$), 0.25 kg. of magnesium sulfate ($MgSO_4 \cdot 7H_2O$) and sulfuric acid to bring the pH value to 7.2–7.3.

This broth is inoculated with 1 liter of the same leaven as in Example 3. The final fermentation is completed after 102 hours and yields a broth having a viscosity of 2800 centipoises. The dry polysaccharide yield is 52%.

It will be apparent that there is provided by this invention an improved beneficial process for polysaccharide-producing fermentation and that changes may be made in the details of formulation and conditions of operation without departing from the spirit of the invention, especially as defined in the following claims.

We claim:

1. In a fermentation process for producing polysaccharides by fermentation of carbohydrate in a fermentation broth with microorganisms of the class Xanthomonas, the improvement comprising seeding the final fermentation broth with inoculum in an amount which does not exceed 2 parts by volume inoculum per 1000 parts by volume fermentation broth.

2. The process as claimed in claim 1 in which the inoculated broth is aerated during fermentation.

3. The process as claimed in claim 1 in which the broth is seeded with inoculum in an amount which does not exceed 0.5 to 1 part by volume per 1000 parts by volume of broth.

4. The process as claimed in claim 1 which comprises preparing the inoculum in a composition corresponding to the composition of the fermentation broth.

5. The process as claimed in claim 1 in which the carbohydrate is starch.

6. The process as claimed in claim 1 in which the carbohydrate is a glucide.

7. The process as claimed in claim 1 in which the carbohydrate is a sugar selected from the group consisting of saccharose, glucose and levulose.

References Cited

UNITED STATES PATENTS

| | | | |
|---|---|---|---|
| 3,391,061 | 7/1968 | McNeely | 195—31 |
| 3,455,786 | 7/1969 | Miescher et al. | 195—31 |

A. LOUIS MONACELL, Primary Examiner

G. M. NATH, Assistant Examiner